(12) United States Patent
De Cock et al.

(10) Patent No.: US 7,288,956 B2
(45) Date of Patent: Oct. 30, 2007

(54) DEVICE AND METHOD FOR DETECTING ROTOR SPEED OF A MULTIPLE PHASE MOTOR WITH BIPOLAR DRIVE

(75) Inventors: Bart De Cock, Wijgmaal (BE); Jan Plojhar, Mokra-Horakov (CZ); Lucas Emiel Elie Vander Voorde, Blaasveld (BE)

(73) Assignee: AMI Semiconductor Belgium BVBA, Oudenaarde (BE)

( * ) Notice: Subject to any disclaimer, the term of this patent is extended or adjusted under 35 U.S.C. 154(b) by 35 days.

(21) Appl. No.: 10/805,972

(22) Filed: Mar. 22, 2004

(65) Prior Publication Data

US 2004/0222779 A1    Nov. 11, 2004

(30) Foreign Application Priority Data

Mar. 21, 2003    (EP) ............................. 03447058

(51) Int. Cl.
    *G01R 31/34*    (2006.01)
(52) U.S. Cl. .................... 324/772; 318/754
(58) Field of Classification Search ............ 324/772, 324/158.1; 318/138, 254, 439, 490, 685, 318/798–799, 805
    See application file for complete search history.

(56) References Cited

U.S. PATENT DOCUMENTS

| | | | | |
|---|---|---|---|---|
| 4,422,040 A * | 12/1983 | Raider et al. | ............... | 324/772 |
| 4,520,302 A * | 5/1985 | Hill et al. | ................... | 318/696 |
| 4,641,066 A * | 2/1987 | Nagata et al. | ............. | 318/254 |
| 4,851,755 A * | 7/1989 | Fincher | ...................... | 318/696 |
| 5,254,914 A * | 10/1993 | Dunfield et al. | ............ | 318/254 |
| 5,376,866 A * | 12/1994 | Erdman | ...................... | 318/254 |
| 5,990,656 A * | 11/1999 | Kardash | .................... | 318/807 |
| 6,555,977 B1 * | 4/2003 | Du et al. | .................... | 318/254 |
| 6,586,898 B2 * | 7/2003 | King et al. | ................. | 318/254 |

* cited by examiner

*Primary Examiner*—Minh N. Tang
(74) *Attorney, Agent, or Firm*—Barnes & Thornburg LLP

(57) ABSTRACT

A method for detecting rotation of a rotor of a multiple phase motor with bipolar drive is described, excluding a three-phase motor with bipolar drive with star connected coils or motor stator windings. The motor has at least a first and a second energizable motor stator winding. A voltage is sequentially and alternately sensed on the first and the second motor stator winding at or near the end of a period of a non-energised state thereof. An apparatus for detecting rotor speed is also provided.

18 Claims, 7 Drawing Sheets

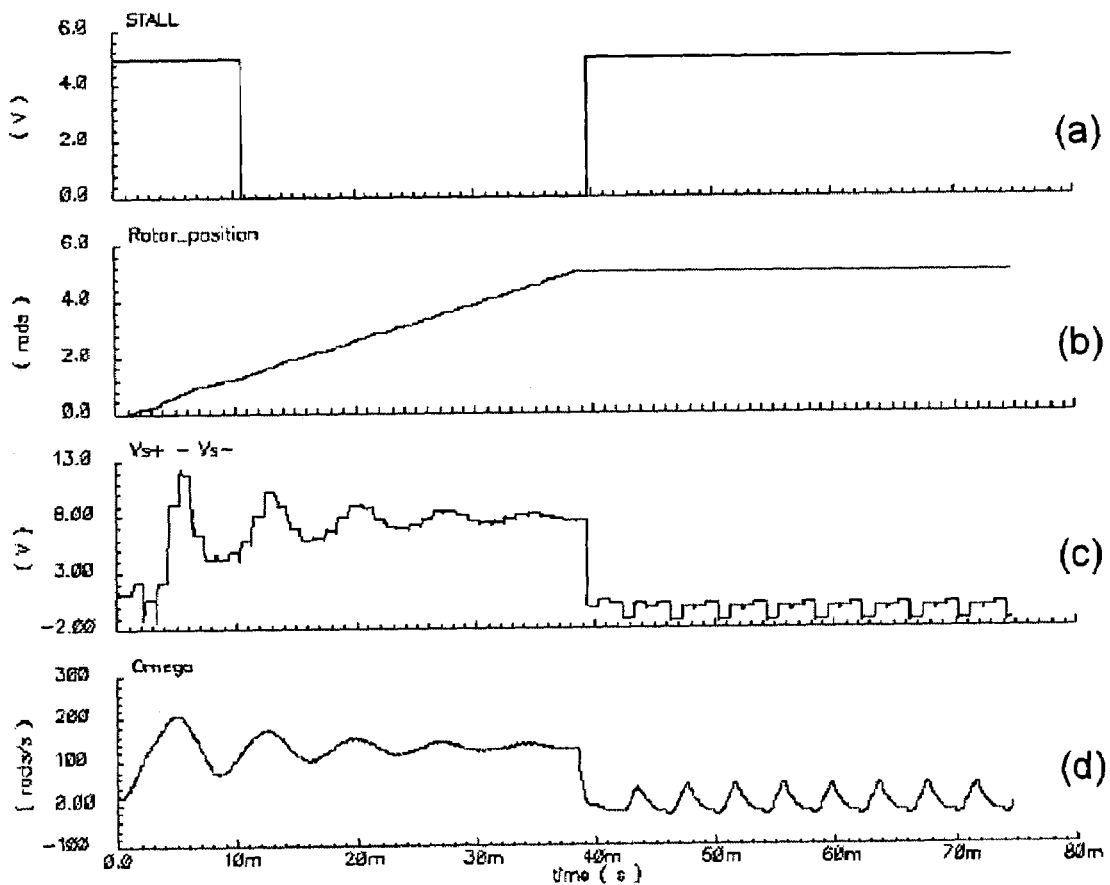
Fig. 10
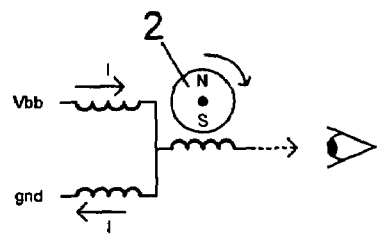
Fig. 11 - PRIOR ART

DEVICE AND METHOD FOR DETECTING ROTOR SPEED OF A MULTIPLE PHASE MOTOR WITH BIPOLAR DRIVE

TECHNICAL FIELD OF THE INVENTION

The present invention relates to a method for detecting rotor speed of a multiple phase motor with bipolar drive, such as a stepper motor or a brushless motor for example.

BACKGROUND OF THE INVENTION

Multiple phase motors with bipolar drive according to the present invention comprise stepper motors on the one hand, such as bipolar stepper motors, either permanent magnet stepper motors or not, as long as forced current can exist, and brushless sensorless DC motors on the other hand.

Stepper motors are widely used in positioning applications and robotics in order to reach high accuracy without an external sensing element. Examples of such positioning applications may be e.g. driving of flaps, belts, mechanical heads etc. The absence of an external sensing element reduces system cost, yet it implies open-loop control of the positioning. This open-loop control, however, can have a negative impact on the system's quality:

- Lost steps are not noticed by the controlling part of the application, which can imply poor positioning accuracy.
- A stall condition causes additional noise.
- A stall condition causes extra wear on the mechanical components attached to the rotor of the stepper motor.
- Speed-variations are not visible and make closed-loop speed control impossible.

It is possible to reduce the negative effects of the open-loop control by implementing a so-called stall-detection or, more generally, a rotor-speed sensing capability.

One possibility of stall-detection for stepper motors is described in EP-A2-0046722. The actual movement of the stepper motor rotor in response to the energizing of the motor stator windings by excitation signals presented in each step interval of the motor is detected. This is done by measuring the amplitude of the voltage signal induced in a non-energized stator winding as a result of the presentation of the excitation signals to the energized stator windings, both in a present step interval and in an immediately preceding step interval. The physics behind the stall detector in the above document is related to the operation of a transformer: a primary coil (active motor winding) generates a magnetic flux which generates in a secondary coil (inactive motor winding) an induced voltage. In case the motor is able to rotate, the magnetic coupling between the coils is small, and there is a small residual magnetic field energy. In case, however, the rotor is blocked, the residual magnetic field energy is larger, hence the secondary coil shows an increased induced voltage. An induced voltage amplitude which exceeds a threshold indicates a failure of the rotor to respond to the newly energized stator windings and may be used as an indication of failure in the motor. This known device works on the principle of current/voltage signals appearing on a non-energized coil (at the beginning of the non-energized phase) as a result of energizing another coil. In as much as the first decay pulse has died out, or on top of the remaining signal, the back emf (for higher rotation speeds) is measured. The principle described is sensitive to supply voltage, because the amplitude of the primary coil varies with supply voltage.

Brushless sensorless DC motors (BLSL-DC) are used in various speed-controlled applications like fans, pumps, ventilator motors for PCs etc. Because of price and manufacturing cost limitations, the motors are not equipped with sensors (like Hall sensors) to monitor rotor speed. Most of the low-cost applications do not require speed detection. However for a higher quality operation, it is highly desired to have speed indication. Some topologies of BLSL-DC motors with star-connected coils allow relatively easy monitoring of BEMF signals (see FIG. 11, 3-phase motor). A non-activated coil picks up a moving magnetic field of the rotor 2, and a bemf voltage signal is visible across the non-activated coil terminals. A wide range of implementations have been described. However, in the case of coils that are not connected in a star, the speed-monitoring or stall-detection is difficult.

SUMMARY OF THE INVENTION

It is an object of the present invention to provide a rotor-speed sensing device and method which solves the problems mentioned above.

The above objective is accomplished by a method and device according to the present invention.

The present invention provides an apparatus for detecting rotation of a rotor of a multiple phase motor with bipolar drive, excluding a three-phase motor with bipolar drive with star connected coils or motor stator windings, the motor comprising at least a first and a second energizable motor stator winding. The invention is not limited to two-phase motors. The motor may for example be a stepper motor, either with a micro-stepping driving or not, or a brushless DC motor. The apparatus comprises means for sequentially and alternately sensing a back electromagnetic force (back EMF or BEMF or bemf) on the first and the second motor stator winding at or near a non-energized state thereof. With at or near the end is meant during the last 50% of the period of the non-energized state, preferably during the last 25%, more preferred during the last 10% and still more preferred during the last 5% of the period of the non-energized state. A motor stator winding is non-energized if no driving current is applied to that motor stator winding by a driving mechanism. Therefore, a non-energized motor stator winding is substantially current free (or substantially current-less or in a substantially current-zero state): some current may however be flowing in that non-energized winding, which is then current generated by the bemf or by a decay of the winding.

In the present invention the voltage or back electromagnetic force over a non-energized motor stator winding is observed, preferably as late as possible in the non-energized phase, where this voltage is a measure of a rotation speed, after the disappearance of an energizing pulse or signal on another motor stator winding.

The means for sensing the back electromagnetic force may comprise timing means for controlling the sensing of the back electromagnetic force on the first respectively second motor stator winding so as to occur during energizing of the second respectively first motor stator winding.

The sensing may have a fixed or adjustable relative position in a non-energized state time window. The back electromagnetic force may be sensed based on the timing means. A memory device may be provided for storing the sensed back electromagnetic force. Multiple samples of the back electromagnetic force may also be made based on the timing means, the multiple samples being stored as a combined value, e.g. a mean value, in the memory device or as separate values in a plurality of memory devices. The plurality of samples may thus be stored as such on a memory device, or as processed values.

The apparatus may further comprise a means for detecting a stall condition of the motor in response to an output of the means for sensing.

The apparatus may also comprise output means for outputting a detection signal indicative of a rotation of the motor rotor or derivatives thereof versus time. Such derivatives of rotation versus time may e.g. include any of speed of rotation, angular acceleration, change of acceleration of the motor rotor.

An apparatus according to the present invention may further comprise driving means for micro-step-driving of the first and second motor stator windings.

An apparatus according to the present invention may comprise means for connecting one terminal of a non-energized motor stator winding to a fixed or reference potential and means for at the same time measuring the voltage at an other terminal of that non-energized motor stator winding, thus measuring a unipolar signal across one non-energized motor stator winding for sensing the voltage.

The present invention also provides a method for detecting rotation of a rotor of a multiple phase motor with bipolar drive, excluding a three-phase motor with bipolar drive with star connected coils or motor stator windings, the motor comprising at least a first and a second energizable motor stator winding. The method comprises sequentially and alternately sensing a voltage on the first and the second motor stator winding at or near a non-energized state thereof. With at or near the end is meant during the last 50% of the period of the non-energized state, preferably during the last 25%, more preferred during the last 10% and still more preferred during the last 5% of the period of the non-energized state.

The sensing of the voltage on the first respectively second motor stator winding may be carried out during energizing of the second respectively first motor stator winding. The motor may be driven in microstepping operation.

The sensing may have a fixed or adjustable relative position in a non-energized state time-window.

The method may furthermore comprise storing sensed voltage values in a memory device. It may also comprise sensing multiple voltage samples, and storing the multiple voltage samples in the memory device. The memory device may comprise a plurality of memory units, each suitable for storing a single voltage sample. Alternatively, the memory device may be suitable for storing a processed or combined sample value, such as a mean value for example.

The measured voltage may be a back electromagnetic force (back EMF or BEMF or bemf).

For sensing the voltage a unipolar signal may be measured across one non-energized motor stator winding by connecting one terminal of the motor stator winding to a fixed or reference potential while measuring the voltage at an other terminal of that non-energized motor stator winding. Alternatively, a differential voltage may be measured. A method according to the present invention is compatible with both measurement techniques.

A method according to the present invention may furthermore comprise outputting a detection signal indicative of a stalled condition of the motor.

A method according to the present invention may furthermore comprise outputting a detection signal indicative of a rotation of the motor rotor or derivatives thereof versus time. The derivatives of rotation versus time may include e.g. any of speed of rotation, angular acceleration or change of acceleration of the motor rotor.

The present invention can only be used for a rotation speed above a pre-set level, in order to have a BEMF which is significant high to be measured.

The motion sensor or rotor-speed sensing device according to the present invention detects actual rotation of the motor rotor independently of the presence of a position feedback signal from a device controlled by the motor. Furthermore, the sensing is simultaneous with the energising of the motor stator windings and provides an instant indication of performance or failure.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 10 illustrates back EMF signals sampled at zero currents (non-energized state) being used as a speed indication.

FIG. 11 is a diagrammatic illustration of a 3-phase brushless DC motor with bipolar drive with star connected coils according to the prior art.

Figure 1:
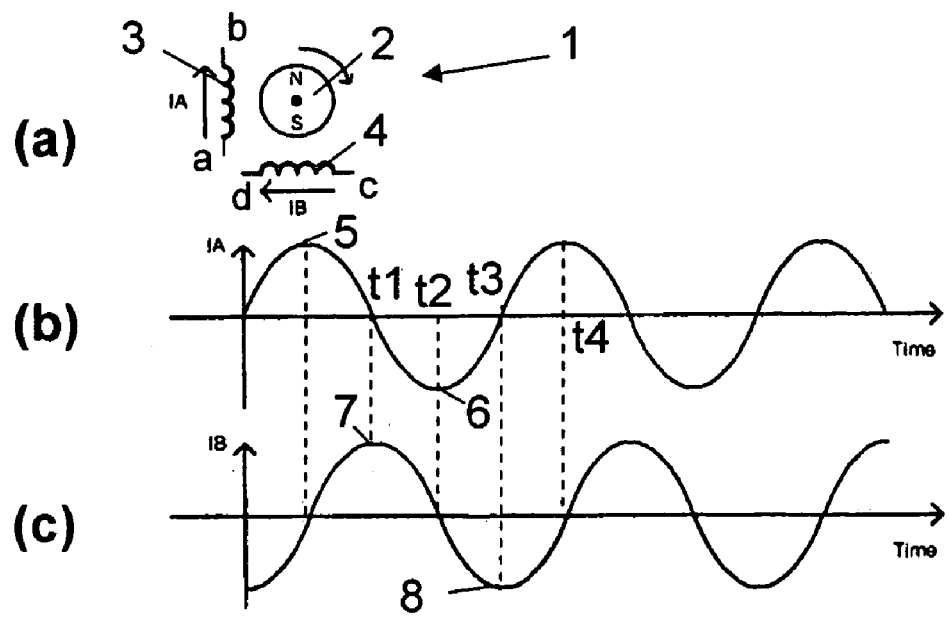
FIG. 1 is a diagrammatic illustration of a two-phase micro-stepping motor with a bipolar drive.

In the different figures, the same reference figures refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter. Thus, the scope of the expression "a device comprising means A and B" should not be limited to devices consisting only of components A and B. It means that with respect to the present invention, the only relevant components of the device are A and B.

Although the present invention is not limited thereto, the detailed description is given for a bipolar stepper motor. The principle of a two-phase stepper motor 1 with bipolar drive is illustrated in FIG. 1. A stepper motor 1 with bipolar drive is a kind of stepper motor, i.e. the rotor 2 of the stepper motor 1 has two poles: a north pole N and a south pole S. A first motor winding 3 is distributed between a first and a second stator or motor pole, e.g. between a top and bottom stator or motor pole, and a second motor winding 4 is distributed between a third and a fourth stator or motor pole, e.g. between a left and right stator or motor pole, the stator and its poles not being represented in the drawings. FIG. 1 is for illustration purposes only: a real stepper motor does not have its coils as shown in this conceptual diagram, but in fact it creates a large number of north/south poles.

A drive current IA flowing from a first terminal a of the first winding 3 to a second terminal b thereof causes the first stator pole, e.g. top stator pole, to be a south pole while the second stator pole, e.g. bottom stator pole, is a north pole. This attracts the rotor 2 in the position shown. If the power to the first motor winding 3 is removed and the second motor winding 4 is energized, i.e. a drive current IB is flowing from a first terminal c of the second winding 4 to a second terminal d thereof, the rotor 2 will turn over 90 degrees, or one step. This 90 degrees turn is an electrical 90 degrees turn and can be implemented in the stepper motor as a 90/M physical turn, depending on the numbers of N/S pole pairs.

To rotate the stepper motor 1 continuously, power is applied to the first and second motor windings 3, 4 in sequence.

A drive circuit for such a bipolar motor 1 requires an H-bridge control circuit for each of the first and second motor windings 3, 4, as far as only a positive supply and a ground is available, as known by a person skilled in the art. If more supplies are available, for example a ground GND, a reference voltage VREF and twice the reference voltage 2*VREF, a method can exist to drive the motor with a single topside switch to 2*VREF and a bottom side switch to 0V, connecting the other side of the coil to VREF, as also known by a person skilled in the art. As an example, both the first and the second motor windings 3, 4 are driven with a sinusoidal current, as shown in parts (b) and (c) of FIG. 1, which illustrate the amplitude of the drive currents IA and IB in function of time. This is done in order to obtain micro-stepping. Micro-stepping allows a stepper motor to stop and hold a position between the full or half step positions, it eliminates the jerky character of low speed stepping motor operation and the noise at intermediate speeds, and it reduces problems with resonance. It can be seen from FIG. 1(b) and (c) that the drive currents IA and IB are both sinusoidal shifted over 90° with respect to each other. This means that when the current IA reaches a maximum 5 or a minimum 6, the current IB equals zero, and vice versa, when the current IB reaches a maximum 7 or a minimum 8, the current IA equals zero.

The micro stepper can also work as a simple stepper motor where electrically always 90 degree turns are made (Full stepping). Also in full-stepping the above principle will work, however the energy decay in the coil can make that the BEMF becomes more difficult to detect.

In a stepping motor, the magnetic field of the motor rotor 2 changes with changes in shaft angle. The result of this is that turning the motor rotor 2 induces an AC voltage in each motor winding 3, 4. This induced voltage is referred to as back electromagnetic force (back EMF or BEMF) or counter electromagnetic force (cEMF). According to an aspect of the present invention, it is this back EMF which is measured in order to determine whether or not the rotor 2 is in a stall condition, and if not, to alternatively determine at least an estimated speed of rotation of the rotor.

When the current IA through the first winding 3 is for example maximal, at the same time the second winding 4 is non-energized, and the current through the second winding 4 is zero, as can be seen in parts (b) and (c) of FIG. 1. Due to the current IA through the first winding 3, the rotor 2 turns so as to align with the magnetic field created by the current IA through the first winding 3. The rotor 2 is thus a turning or rotating magnet, and this rotating magnet generates a moving magnetic field. Hence, there are two synchronous fields inside the motor, i.e. the stator field induced by the coil current and the rotor field, which is the magnetic field around the rotating rotor 2. The difference in alignment between these two fields or between the rotor flux and the stator flux is called the load angle.

The second winding 4 picks up the moving magnetic field of the rotor 2, and although it is non-energized, no current is sent through this second winding 4 by a driving mechanism, a back EMF voltage signal is visible across the first and second terminals c, d of the second winding 4. Observation of the back EMF signals can only be done at a limited number of observation points in time, more particularly at each winding 3,4 when it is non-energized, or thus when the drive current through the particular winding 3,4 has a zero-crossing. For the example of a two-phase bipolar stepper motor as given above, observation of the back EMF signals can be done at the first winding 3 at a moment t1 (see FIG. 1(b)), when the drive current IA is zero and the drive current IB is maximal, at the second winding 4 at a moment t2 (see FIG. 1(c)), when the current IB is zero and the current IA is minimal (or maximal negative), at the first winding 3 at a moment t3, when the current IA is zero and the current IB is minimal (or maximal negative) and at the second winding 4 at a moment t4, when the current IB is zero and the current IA is maximal.

Figure 2:
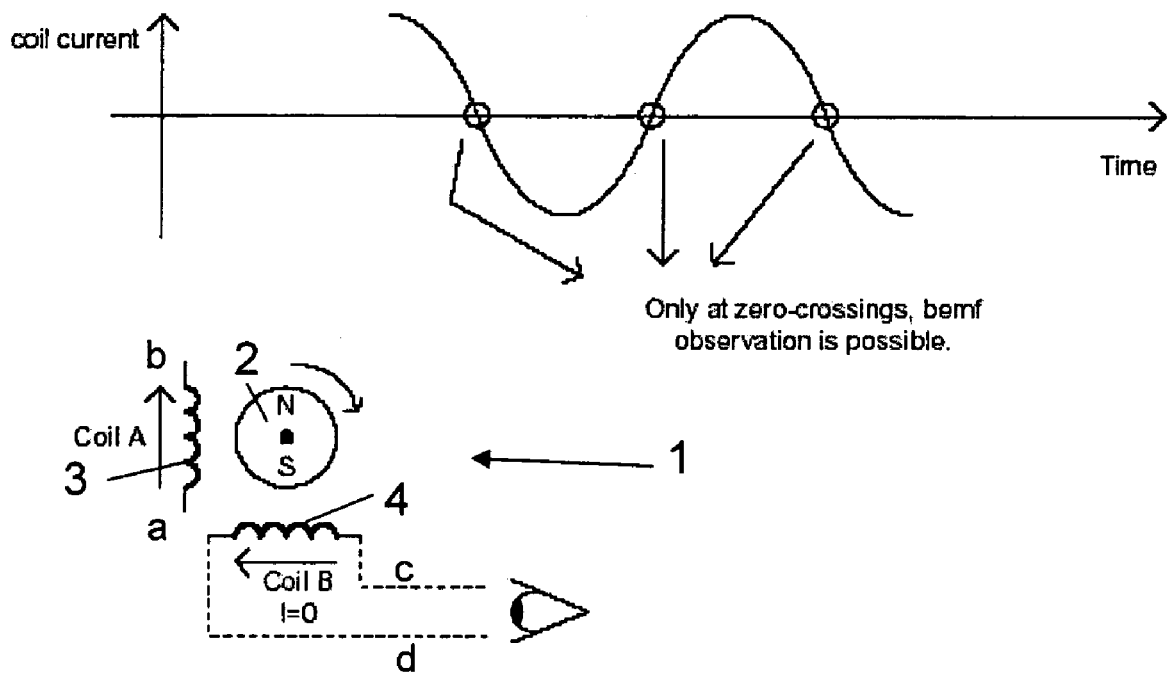
FIG. 2 is a diagrammatic illustration of back EMF sensing according to the present invention on a two-phase micro-stepping motor with bipolar drive.

In case the stepper motor is operated in a micro-stepping mode, as explained above, or at higher speeds in half-step or full-step mode, then rotor-acceleration changes are relatively small, because there is a continuous movement of the rotor 2. The generated back EMF signal is sensed across the non-active coil. This is shown in FIG. 2, which is a diagrammatic illustration of back EMF sensing on a two-phase micro-stepping motor with bipolar drive.

An optimised sensing time (or sampling time) can be chosen, as a function of the motor construction parameters, the expected rotor speed and the shape of the applied coil-currents. Fast moving rotors in combination with high coil-currents require back EMF sampling at or near the end of the non-energized or substantially current-less state of the coil, or even multiple samples during the non-energized state. With at or near the end is meant during the last 50% of the period of the non-energized state, preferably during the last 25%, more preferred during the last 10% and still more preferred during the last 5% of the period of the non-energized state. If multiple samples are taken during the non-energized state, for example a first sample may be taken during the first 10% of a period of the non-energized state, a second sample may be taken at between 40% and 60% of that period, and a third sample may be taken during the last 10% of the period of the non-energized state. Taking more than 3 samples during a period of the non-energized state may be preferred, and these samples may be, but do not need to be, spread equally over a period of the non-energized state. Motor construction parameters influence the amplitude and shape of the bemf signals as well as the overall magnetic situation inside the motor. For a given motor and a known applied coil current, the influence of these can be removed using calibration techniques.

In case the stepper motor is accelerating or decelerating as a result of external load conditions, then the speed variations of the rotor will induce variations of back EMF signals. The mismatch of observed signal variation with calibrated values is then indicative for rotor-speed.

In case the stepper motor is accelerating or decelerating as a result of the applied commutation signals (Hbridge activation of the stepper), which is the normal operation of the stepper motor, the back EMF signal variations require more intense processing (related to potential oscillation of rotor speed while the rotor is adapting its speed to keep track of commutation signal frequency).

Back EMF voltage sensing is in the first place related to rotor speed and is less sensitive to supply noise or coil current variations. The signal processing can be done a priori without microcontroller. With a microcontroller, however, much better evaluation of back EMF signals is possible, related to the increased processing power.

If the motor is not charged with a load, the magnetic rotor field follows the magnetic stator field with the same velocity and both fields are in phase. When a load is present, the rotor field still follows the stator field, but under a load angle, i.e. both fields are not in phase anymore. In other words, both fields still have the same velocity but the rotor field lags the stator field. Thus, the mean velocity remains the same and forms a DC component of the rotor velocity. The rotor velocity furthermore comprises an AC component, which relates to the load angle variation.

By sending a drive current through one of the windings 3, 4, a torque is applied to the rotor 2. The torque/load angle characteristic looks like the characteristic of a 'torsion spring' and may be expressed by:

$$T = T_{max} \sin \delta$$

wherein T is the torque, $T_{max}$ is the maximum rated torque and δ is the load angle. A maximum torque may be expected when the load angle is 90 degrees. When changing the drive current, the torque changes and thus also the load angle. Hence, a variation in the drive current will have an impact on the load angle and thus on the AC component of the rotor speed.

As the present invention deals with, amongst others, measuring the changes in rotational speed, the present invention may also be applied for measuring changes in load angle or any other speed dependent parameter.

Figure 3:
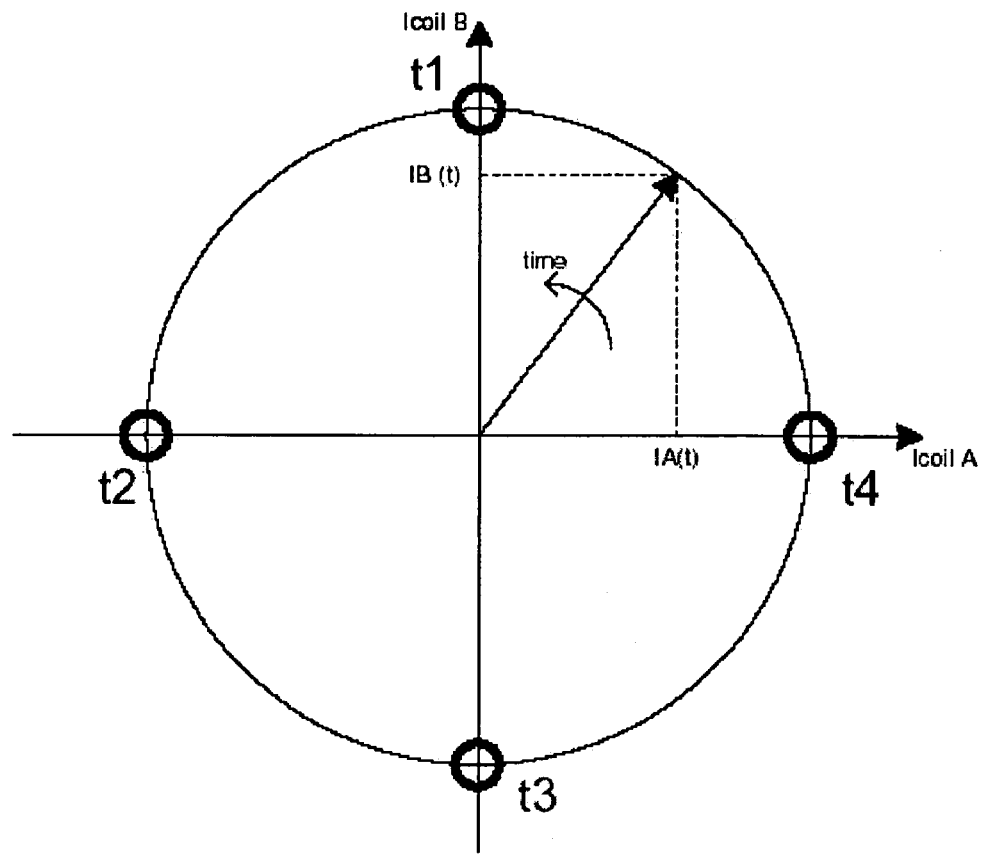
FIG. 3 is a current-vector representation affair available observation points in time with one of the coils of the two-phase micro-stepping motor with bipolar drive being non-energized.

FIG. 3 is a current-vector representation of the four available observation points t1, t2, t3, t4 in time, with one of the coils being non-energized. Time is represented by a vector which rotates anti-clockwise around an origin. Projection of the time vector on the orthogonal axes IcoilA and IcoilB gives the amplitudes of the drive currents IA and IB through the first and second windings 3,4 respectively. As can be seen from FIG. 3, at a moment t1, the drive current IA through the first winding 3 is zero, thus the first winding 3 is non-energized, and the drive current IB through the second winding 4 is maximal. At that moment, the back EMF voltage over the first winding 3 can be measured. At a moment t2, the drive current IA through the first winding 3 is maximal negative, and the drive current IB through the second winding 4 is zero, or thus the second winding 4 is non-energized. At that moment t2, the back EMF voltage over the second winding 4 can be measured. As the drive currents IA and IB are applied by the user, their phase is exactly known, and thus the moments t1, t2, t3, t4 at which any of the windings 3, 4 is non-energized (or thus has a drive current signal IA, IB which equals zero) is exactly known.

The back EMF voltages measured are an indication of whether or not the rotor 2 is turning, i.e. they are an indication of whether or not the rotor 2 is in a stall condition.

Figure 4:
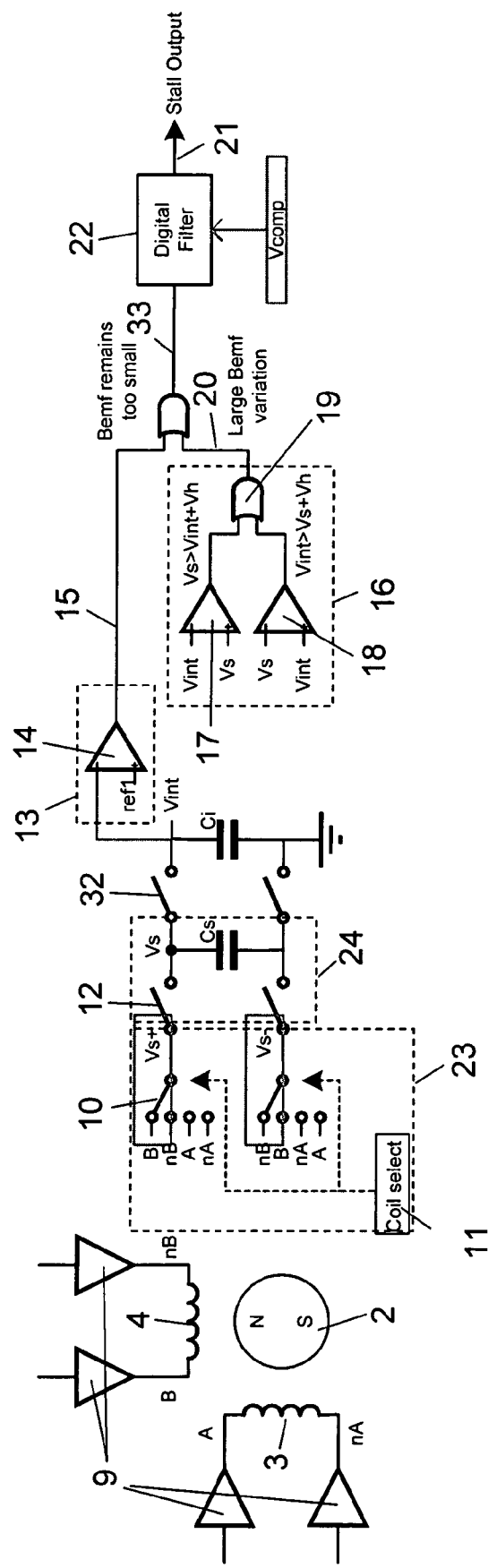
FIG. 4 illustrates an example of a top-level schematic of analog processing of back EMF signals obtained according to the present invention.

FIG. 4 is a schematic representation of analog processing of back EMF signals generated. Drivers 9 are provided for sending drive current through the first and second windings 3, 4 in one direction or another. A selection circuit 23 is provided for selecting at which terminals A, nA, B, nB of the first and second windings 3, 4 the voltage will be measured. The selection circuit 23 may comprise a first set of coil select switches or multiplexing switches 10, driven by a coil select unit 11, for selecting between which terminals of the first and second windings 3, 4 a back EMF voltage is to be measured. Either the back EMF voltage is measured between the terminals B and nB, or between nB and B, or between A and nA, or between nA and A. The coil select switches 10 or multiplexing switches may for example be implemented as transistors in a semiconductor circuit. A sampling circuit 24 is provided for sampling the voltage at the selected terminals A, nA, B, nB. The sampling circuit 24 may comprise a second set of switches 12, sampling switches, for transferring the value of the back EMF signal to a memory device at certain moments in time, for example the back EMF signal may be stored in a sample capacitor Cs. The timing of the sampling switches 12 is known from the drivers 9 for applying drive current through the first and second windings 3, 4. The back EMF value measured during a previous cycle is filtered or integrated by temporarily connecting the sample capacitor Cs with an integrating element, such as integrating capacitor Ci, by means of connecting switches 32. The sample capacitor Cs together with the connecting switches 32 works as a switched capacitance resistor which forms together with the integrating capacitor Ci a first order RC filter. A back EMF comparison circuit 13 is provided, wherein the filtered measured back EMF signal Vint is compared with a reference value ref1, e.g. in a first comparator element 14. If the filtered measured back EMF signal Vint is smaller than the reference value ref1, a signal 15 indicative of a too small back EMF is output from the first comparator element 14. The back EMF values measured during previous cycles were filtered on the integrating element, such as e.g. integrating capacitor Ci, and the voltage Vint corresponding to the charge on the integrating capacitor Ci is now compared with the voltage Vs in the memory device, for example on sample capacitor Cs, in a back EMF variation detection circuit 16. This back EMF variation detection circuit 16 may for example comprise a second comparator 17, a third comparator 18 and an OR element 19. If the newly measured back EMF value Vs exceeds the filtered measured back EMF value Vint plus a threshold voltage or hysteresis Vh, or if the newly measured back EMF value Vs is smaller than the filtered measured back EMF value Vint minus a threshold voltage or hysteresis Vh, then a large back EMF variation signal 20 is output from the back EMF variation detection circuit 16. If either a signal 15 indicative of too small a back EMF is generated, or a large back EMF variation signal 20 is generated, then an output signal 33 is generated indicating that the rotor 2 is in a stall condition. The output signal 33 may be sampled synchronously with the applied steps by means of a sampling signal Vcomp. A digital filter 22 may be provided before the output of a stall output signal 21. This digital filter 22 provides a time delay (small digital filter). Before a correct voltage value is built on the integrating element, e.g. integrating capacitor Ci, a number of revolutions of the rotor 2 must have taken place. Therefore, if the output signal 21 is indicating that the rotor is in a stall condition, and this output signal 21 needs to be changed (such as for example at start-up) to no-stall condition, a debounce time is incorporated in the circuit, i.e. signal 33 must have in N succeeding samples the same (no-stall) value before the output signal 21 indicates that there is no stall condition. If, however, the output signal 21 indicates that there is no stall condition, and a stall condition would be detected, then a debounce time delay equal to zero is incorporated in the circuit, i.e. the detection of a stall condition is done immediately.

As mentioned above, the influence of motor construction parameters on the amplitude of the signals as well as on the overall magnetic situation inside the motor can be removed for a given motor and for a known applied coil current. Explicitly for the analog implementation embodiment as given in FIG. 4, the following measures can be taken:

The reference voltage ref1 to which the filtered measured back EMF signal Vint is compared, can be made ~omega (rotation speed) and ~motor constant.

The hysteresis Vh can be made trimmable.

Figure 5:
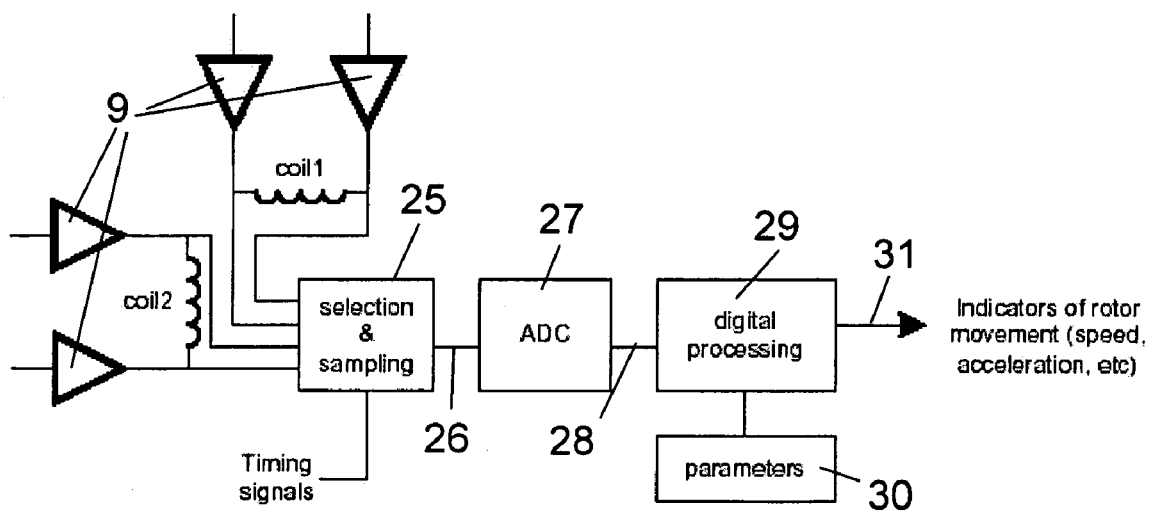
FIG. 5 illustrates an example of a top-level schematic of a digital processing of back EMF signals obtained according to the present invention.

FIG. 5 is a schematic representation of digital processing of the back EMF signals. The circuit represented in FIG. 5 comprises a selection and sampling circuit 25 for selecting at which terminals the back EMF voltage value is to be captured, and for sampling that value, thus generating a signal 26 corresponding to a measured back EMF value. The selection and sampling circuit 25 receives timing signals for doing the sampling at the right moments in time as explained above, i.e. at those moments in time when any of the windings 3, 4 are in a non-energized state. The circuit required for doing this is comparable to multiplexing switch 10 in FIG. 4, in front of an ADC. The measured back EMF value signal 26 is fed to an analog-to-digital converter (ADC) 27, where it is converted into a digital value 28. This digital value 28 is then digitally processed in a digital processing unit 29 to which parameters 30 are fed. The output of the digital processing unit 29 is a signal 31 indicative for rotor movement this rotor movement including for example speed and/or acceleration.

Figure 6:
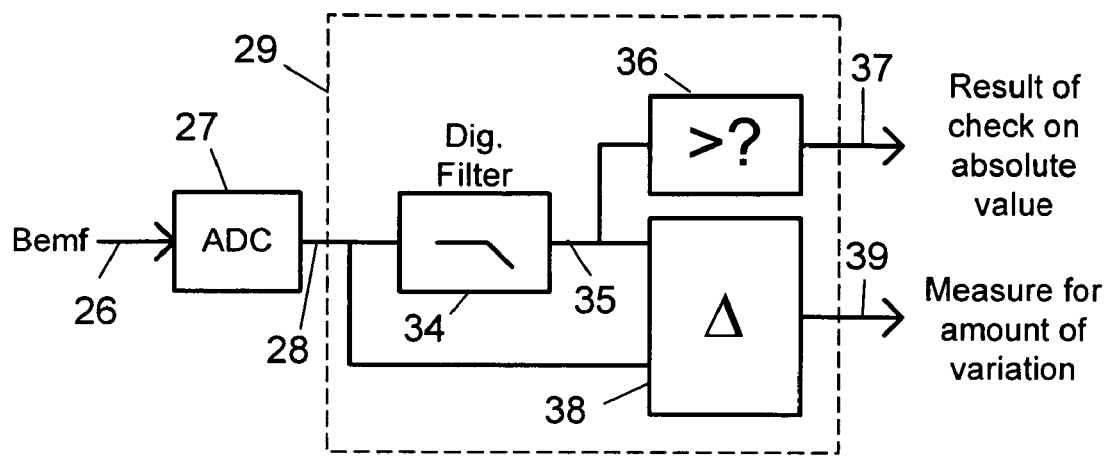
FIG. 6 illustrates an embodiment of a digital processing unit as may be used in the digital processing implementation illustrated in FIG. 5.

FIG. 6 illustrates an embodiment of a digital processing unit 29. It may comprise a digital filter 34 for filtering the digital BEMF value 28. The filtered digital BEMF value 35 is fed to a value checking means 36 for checking on the absolute value of the BEMF signal. The result of this check is output as a first output signal 37. The filtered digital BEMF value 35 is also fed to a variation detection means 38, such as a comparator element for example, together with the digital BEMF value 28. This means that both a present signal and a previous signal are fed to the variation detection means 38, where an amount of variation is detected, which amount of variation is output as a second output signal 39.

Figure 7:
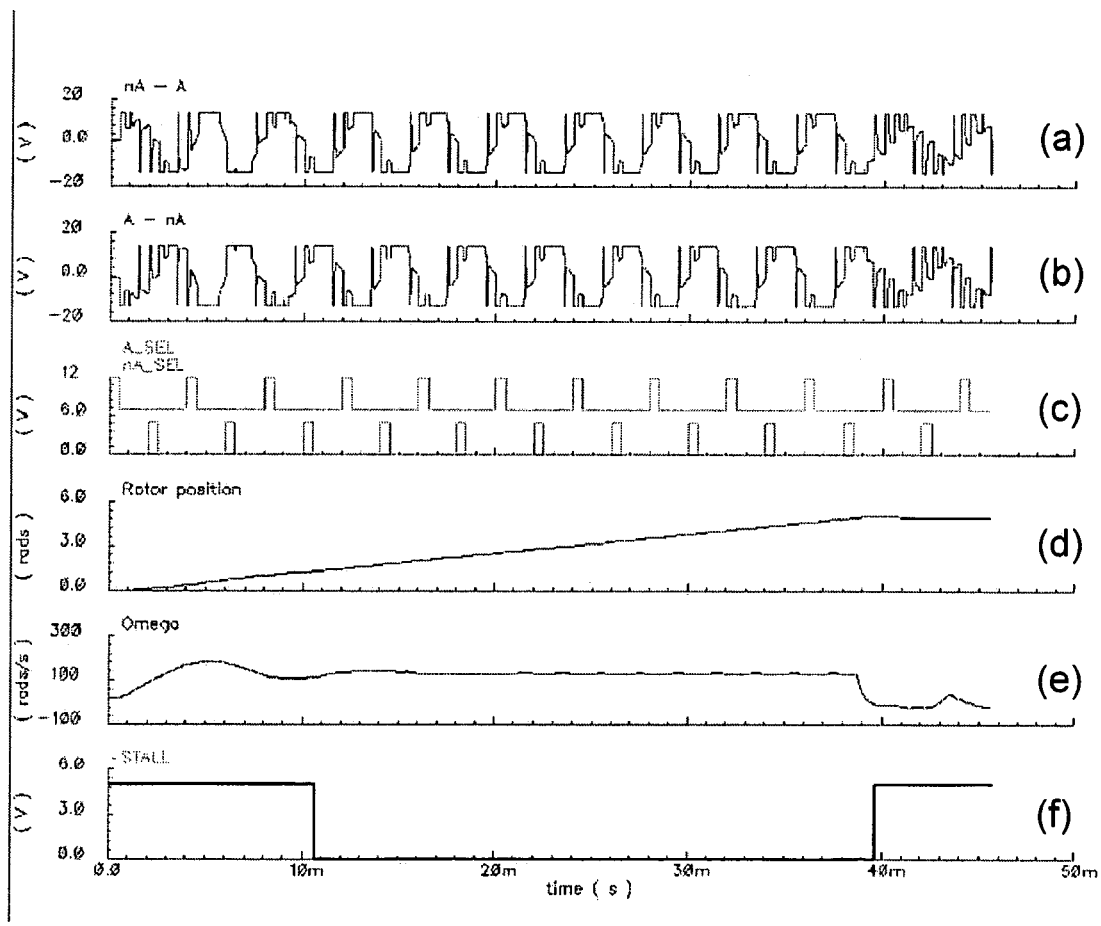
FIG. 7, FIG. 8 and FIG. 9 illustrate relevant back EMF wave-forms with indication of sampling in time of the signals.
Figure 8:
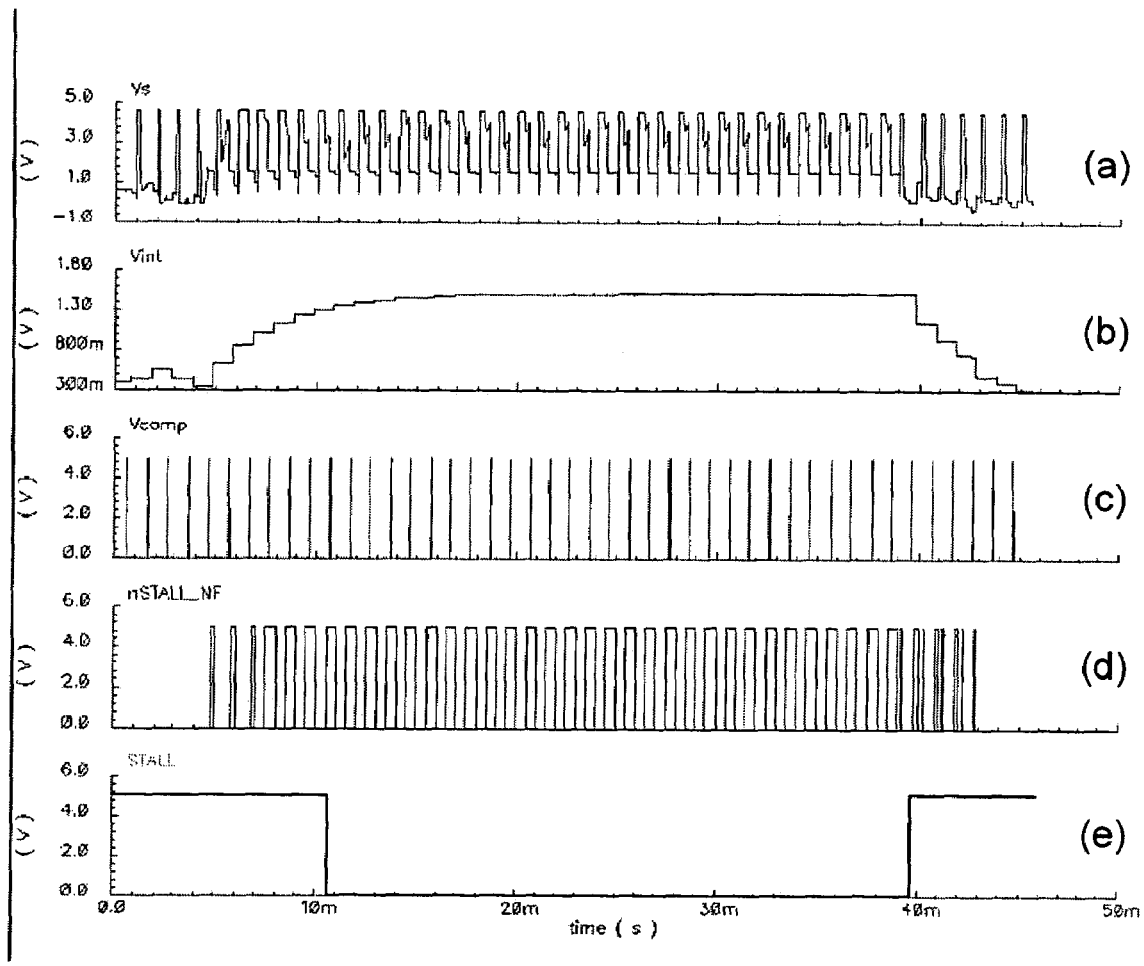
Figure 9:
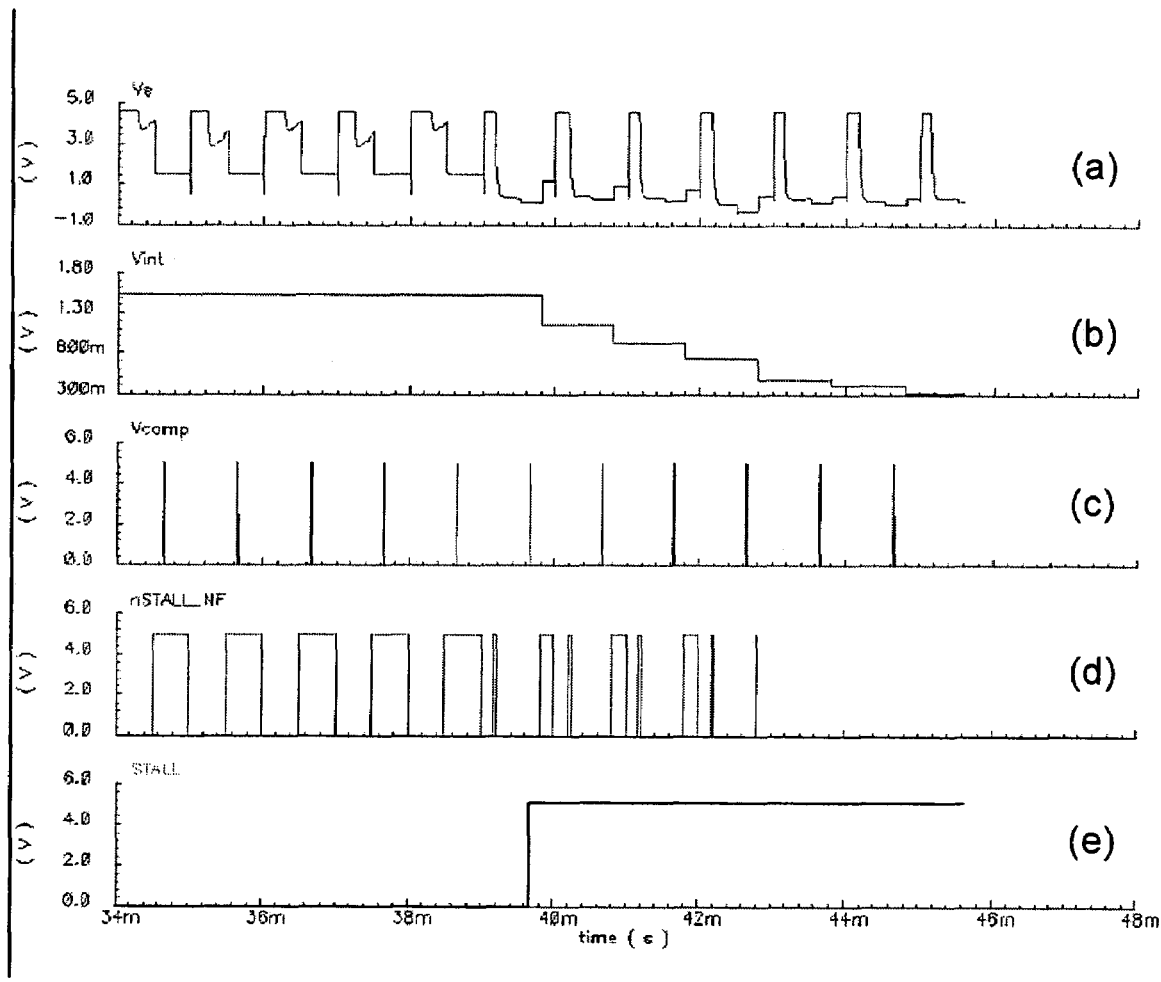

FIG. 7, FIG. 8 and FIG. 9 show, in function of time, relevant back EMF wave-forms with indication of sampling of the signals. The timings given in diagrams 7, 8 and 9 are indicative only: the values represented depend on rotation speed, stepping rate, and so on.

FIG. 7(*d*) shows the position of the rotor 2 in function of time. At t=0 ms, the rotor position is the same as at t=1 ms. This means the rotor 2 is not turning, or the rotor 2 is in a stall condition. Shortly after t=1 ms, the rotor 2 starts to rotate, up to about t=39 ms. As shown in FIG. 7(*e*), the rotation speed omega of the rotor 2 is 0 rad/s at t=0 ms. At t=1 ms, when the rotor 2 starts to rotate, the rotation speed omega of the rotor starts to increase. After a while, in the example given at t=15 ms, the rotation speed omega stabilises at a certain value. At t=18.5 ms, the rotation speed omega drops, which results in the rotor position not changing anymore (see FIG. 7(*d*)), and the circuit outputting a signal 21 indicative of the stall condition almost immediately, as can be seen from FIG. 7(*f*). On the other hand, when the system was indicating a stall condition, as at the left hand part of FIG. 7(*f*), it takes a while (about 10 ms) before a signal indicating that there is no stall condition anymore is generated.

FIG. 7(*a*) shows the voltage over the first winding 3 in function of time, between terminal nA and terminal A. FIG. 7(*b*) shows the voltage over the first winding 3 in function of time, between terminal A and terminal nA. The graphs of FIG. 7(*a*) and of FIG. 7(*b*) are each other's inverse.

FIG. 7(*c*) shows at which moments in time the switches 10 are switched, driven by the coil select circuit 11, from selecting nA-A to A-nA. Another back EMF voltage measurement is made every two ms on the first winding 3, for example at even numbers of timings. Not represented in the drawings, back EMF voltage measurements are made every two ms on the second winding 4, at odd numbers of timings. This means that, at t=0 ms, the back EMF voltage is measured at the first winding 3 in a first direction; at t=1 ms the back EMF voltage is measured at the second winding 4 in a first direction; at t=2 ms the back EMF voltage is measured at the first winding 3 in a second direction; and at t=3 ms the back EMF voltage is measured at the second winding 4 in a second direction.

FIG. 8(*a*) illustrates the voltage Vs, corresponding to the charge on the sampling capacitor Cs of FIG. 4. When the rotor 2 rotates (middle part of FIG. 8(*a*)), the measured Vs, i.e. the measured back EMF, has a large value. When the rotor 2 stops rotating, at about 39 ms, the measured Vs has a smaller value, or is even zero.

FIG. 8(*b*) illustrates the voltage Vint, corresponding to the charge on the integrating capacitor Ci. It can be seen that, when the motor is not in a stall condition, the voltage Vint over the integrating capacitor Ci increases up to a certain level. When the rotor 2 goes in a stall condition (right hand part of FIG. 8(*b*)), the voltage over the integrating capacitor Ci decreases.

FIG. 8(*c*) illustrates the sampling clock for digital filter 24. FIG. 8(*d*) illustrates the unfiltered output signal 33.

FIG. 8(*e*) is the same graph as FIG. 7(*f*).

FIG. 9 is an enlarged view of part of FIG. 8, more particularly the part between t=34 ms and t=48 ms, i.e. the part where the rotor goes in a stall condition.

At t=39 ms, an event occurs (the rotor 2 stalls), and the sampled value Vs is not high for as long a time as previously. Vint, however, remains high at t=39 ms, as Vint is the integrated value of the previous samples. As from t=40 ms, the voltage on the integrating capacitor Ci begins to decrease. When the signal Vint becomes smaller than Vs−Vh, then a stall output signal is generated. This is done almost immediately, i.e. the digital filter 22 has a delay equal to zero.

FIG. 10 illustrates how the measurement of the back EMF voltage can be indicative of the rotor speed. In this schematic, in order to show the correlation between sampled data and rotation speed, the circuit has been optimised to show no clipping. The correctly sampled values at both sides of the coil are VS+ and VS−. As can be seen from FIG. 10(*a*) and FIG. 10(*b*), a signal indicative of a stall condition is generated, and this a bit longer than the stall condition lasts. As soon as another stall condition appears, a signal indicative of said stall condition is generated almost immediately. While the rotor position changes, as in FIG. 10(*b*), the rotor has a certain rotation speed omega, as illustrated in FIG. 10(*d*). When the rotor stalls, the rotation speed of the rotor drops to about 0 rad/s. The signal (Vs+−Vs−), which is the voltage across the coil without clamping due to sampling switches, follows the rotation speed signal omega. This means that the larger the rotation speed is, the larger the signal (Vs+−Vs−) is and vice versa. Therefore, the signal (Vs+−Vs−) is an indication of the rotor speed. It can also give an indication of the acceleration, deceleration etc. of the rotor.

It is to be understood that although preferred embodiments, specific constructions and configurations, as well as materials, have been discussed herein for devices according to the present invention, various changes or modifications in form and detail may be made without departing from the scope and spirit of this invention. For example, although the specific embodiments described all concern two-phase motors, the invention is not limited thereto. The invention also concerns three-phase or more motors.

The invention claimed is:

1. A method for detecting rotation of a rotor of a multiple phase motor with bipolar drive, the motor comprising at least a first and a second energizable motor stator winding, the method comprising sequentially and alternately sensing a voltage on the first and the second motor stator winding at or near the end of a period of a non-energized state thereof,
wherein the method furthermore comprises storing the sensed voltage amplitude values of the first and second motor stator windings in a memory device.

2. A method according to claim 1, wherein the sensing of the voltage on the first motor stator winding is carried out during energizing of the second motor stator winding, and wherein the sensing of the voltage on the second motor stator winding is carried out during energizing of the first motor stator winding.

3. A method according to claim 1, wherein the sensing has a fixed or adjustable relative position in a non-energized state time-window.

4. A method according to claim 1, furthermore comprising sensing multiple voltage samples, and storing the multiple samples in the memory device.

5. A method according to claim 1, wherein the motor is driven in microstepping operation.

6. A method according to claim 1, wherein the voltage is a back EMF.

7. A method according to claim 1, furthermore comprising outputting a detection signal indicative of a stalled condition of the motor.

8. A method according to claim 1, furthermore comprising outputting a detection signal indicative of a rotation of the motor rotor or derivatives thereof versus time.

9. A method according to claim 1, where for sensing the voltage a unipolar signal is measured across one non-energized motor stator winding by connecting one terminal of the motor stator winding to a fixed or reference potential while measuring the voltage at an other terminal of that non-energized motor stator winding.

10. A method according to claim 1 excluding a three-phase motor with bipolar drive with star connected coils.

11. An apparatus for detecting rotation of a rotor of a multiple phase motor with bipolar drive, the motor comprising at least a first and a second energizable motor stator winding, the apparatus comprising means for sequentially and alternately sensing a back electromagnetic force on the first and the second motor stator winding at or near the end of a period of a non-energized state thereof,
wherein the apparatus furthermore comprises means for storing the sensed voltage amplitude values of the first and second motor stator windings.

12. An apparatus according to claim 11, excluding a three-phase motor with bipolar drive with star connected coils.

13. An apparatus according to claim 11, wherein the means for sequentially and alternately sensing has means for sensing of a voltage on the first motor stator winding during energizing of the second motor stator winding and means for sensing of a voltage on the second motor stator winding during energizing of the first motor stator winding.

14. An apparatus according to claim 11, wherein the means for sequentially and alternately sensing has a fixed or adjustable relative position in a non-energized state time-window.

15. An apparatus according to claim 11, wherein the means for sensing has means for sensing multiple voltage samples, further comprising means for storing the multiple samples.

16. An apparatus according to claim 11, furthermore comprising means for outputting a detection signal indicative of a stalled condition of the motor.

17. An apparatus according to claim 11, furthermore comprising means for outputting a detection signal indicative of a rotation of the motor rotor or derivatives thereof versus time.

18. An apparatus according to claim 11, further comprising means for sensing a unipolar signal across one non-energized motor stator winding by connecting one terminal of the motor stator winding to a fixed or reference potential while measuring the voltage at an other terminal of that non-energized motor stator winding.

* * * * *